Patented Feb. 11, 1941

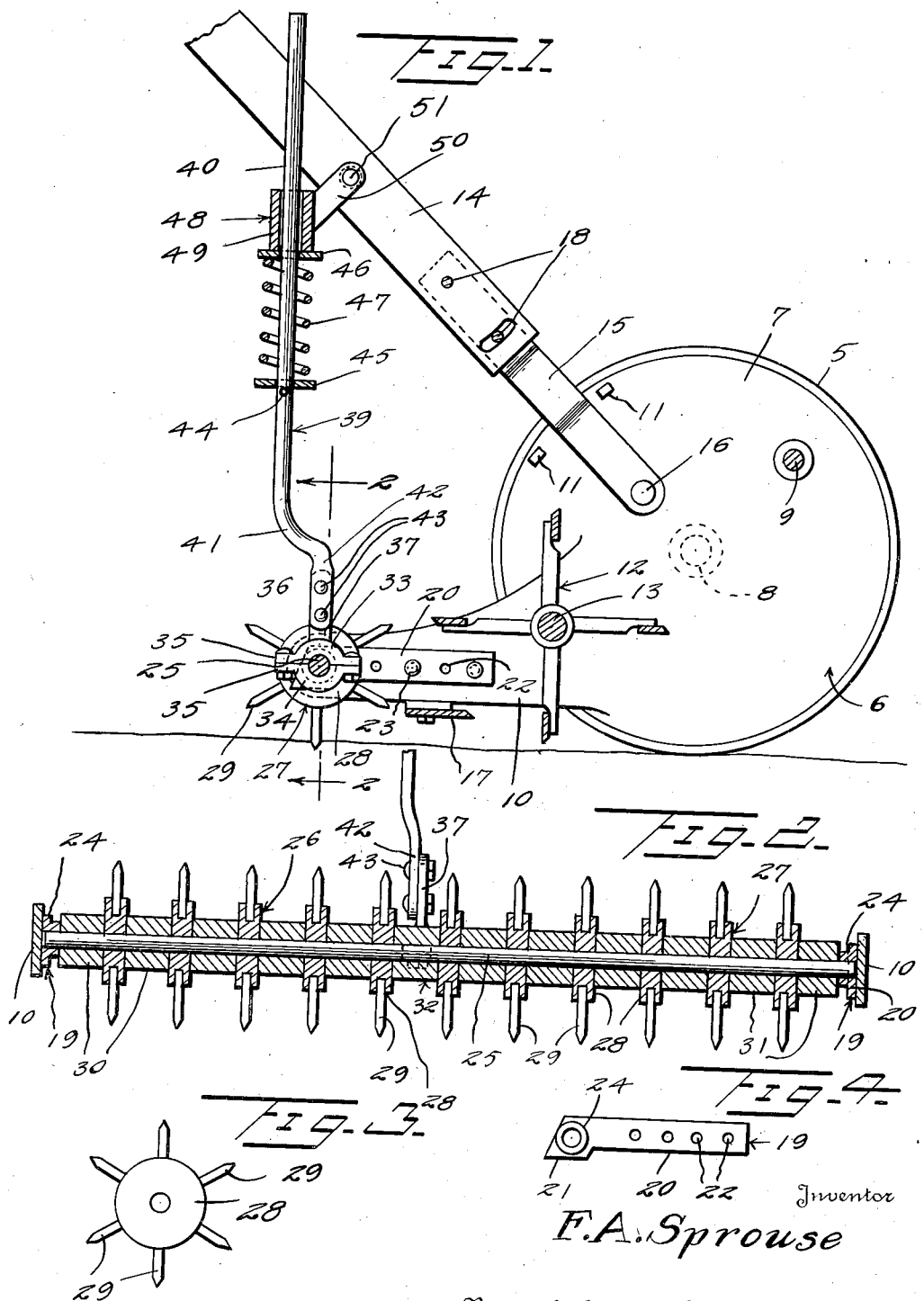

2,231,821

UNITED STATES PATENT OFFICE 2,231,821

GROUND LOOSENING ATTACHMENT FOR LAWN MOWERS

Frank A. Sprouse, Salem, Oreg.

Application June 4, 1940, Serial No. 338,823

5 Claims. (Cl. 97—59)

This invention relates to a ground loosening attachment for lawn mowers.

The invention aims to provide, in a manner as hereinafter set forth, a lawn mower with means for loosening the ground immediately following the mowing operation.

The invention further aims to provide, in a manner as hereinafter set forth, a lawn mower including a spring urged ground loosening means immediately following the stationary cutter of the mower having ground penetrating elements capable of having the depth of their penetration into the ground increased from the handle of the mower during the operation of the latter.

The invention further aims to provide, in a manner as hereinafter set forth, a spring urged ground loosening attachment for lawn mowers having spaced sets of ground loosening elements revoluble in unison and disposed rearwardly of the stationary cutter of the mower.

The invention further aims to provide, in a manner as hereinafter set forth, an attachment for the purpose referred to including revoluble sets of ground penetrating devices and whereby the depth of penetration of said elements may simultaneously increased from the handle of the mower during the operation of the latter.

The invention further aims to provide, in a manner as hereinafter set forth, an attachment for the purpose referred to which is simple in its construction and arrangement, strong, durable, compact, readily installed with respect to the back of a lawn mower, thoroughly efficient in its use, and comparatively inexpensive to manufacture.

Embodying the aims aforesaid and others which may hereinafter appear, the invention consists of the novel construction, combination and arrangement of parts as will be more specifically described and illustrated in the accompanying drawing wherein is shown an embodiment of the invention, but it is to be understood that changes, variations, and modifications may be resorted to which fall within the scope of the invention as claimed.

In the drawing:

Figure 1 is a vertical sectional view illustrating the adaptation of the attachment, in accordance with this invention, relative to a lawn mower.

Figure 2 is a section on line 2—2 Figure 1,

Figure 3 is a detail in side elevation illustrating the form of the sets of ground loosening elements, and Figure 4 is a detail in side elevation illustrating the form of the combined hanger and bearing members for the shaft of the attachment.

With reference to the drawing, there is shown with respect to a lawn mower, one of its traction wheels at 5, a portion of its frame generally indicated at 6, one of the side cheeks of the frame 6 at 7, the pintle or journal for wheel 5 at 8, the tie bar between the side cheeks 7 at 9, the rearwardly extending supports at 10 for the rear or trailing roller (not shown), the stationary cutter bar and the shaft of the bodily revoluble cutter device and which form parts of frame 6, the spaced aligned stops at 11 on the inner face of each cheek, the revoluble cutter device at 12, the shaft at 13 for the cutter 12, the handle at 14, one of the sections of the bail for the handle 14 at 15, the connection between the bail section 15 and the cheek 6 at 16, the stationary cutter for correlation with the revoluble cutter device 12 at 17 which is secured with the bottom edges of supports 10, and the means at 18 for connecting the bail to the handle 14. Each bail section 15 has a part thereof arranged between the stops 10 on a side cheek. The rear roller, not shown, is not employed, as the attachment, in accordance with this invention is substituted therefor. The supports 10 are arranged in parallel spaced relation. The parts aforesaid are of known form and arrangement.

The ground loosening attachment, in accordance with this invention, includes a pair of combined bearing and hanger members 19 of like form and oppositely disposed. These members are secured against the inner faces of the supports 10. Each member 19 is of angle form and includes a horizontal leg 20 and a depending rearwardly inclined leg 21 of less length but of greater width than leg 20. The latter is formed with openings 22 for the passage of holdfast means 23 for the purpose of securing member 19 to a support 10. The leg 21 depends from the rear part of the bottom edge of leg 20. The rear edges of legs 20, 21 are disposed at like forward inclinations. The rear portion of the inner face of member 19 has formed integral therewith an inwardly extending annular bearing 24 of a diameter to extend upon the legs 20, 21. The bearing 24 has two portions of different outer diameters and that portion of largest inner diameter is integral with the legs 20, 21.

The attachment includes a revoluble operating shaft 25 having its ends journaled in the bearings 24 on the inner faces of the members 19. Fixed to and bodily movable with the shaft 25 are two spaced aligned series of spaced ground loosening devices. The devices of one series are indicated at 26 and those of the other at 27. The said devices of each series are of like form and each consists of an annulus 28 provided with a set of radially disposed ground loosening elements 29 in the form of pointed teeth. The inner ends of the elements preferably will be anchored in the outer edges of the annuli 28, but it is to be understood that elements 29 may be cast integral with said annuli. Arranged between the devices of the series 26 and one of the members 19 are spacing collars 30, which are suitably mounted on shaft 25 and of less diameter than the annuli 28. Arranged between the devices of the series 27 and the other member 19 are spacing collars 31 which are suitably mounted on shaft 25 and of less diameter than the annuli. Preferably the collars 30, 31 will be of uniform diameter and they are so shown. Arranged between the inner one of the series of devices 26 and the inner one of the series of devices 27, as well as being loosely mounted on the central part of shaft 25, is a combined coupling and spacing element 32 formed of oppositely disposed upper and lower semicircular flanged sections 33, 34 of like form. The flanges 35 of the sections 33, 34 are secured together by the holdfast means 36 for securing said sections together and in encompassing relation with respect to shaft 25. The section 33 has formed integral therewith an upstanding arm 37 for a purpose to be referred to.

The attachment includes a shiftable spring urging structure 38 for the devices 26, 27 to cause the elements 29 to normally penetrate the ground to a certain extent, but the extent of the penetration of elements 29 may be increased by the handle 14 in a manner to be referred to. The structure 38 includes an upright bar 39 formed of an upper portion 40, an intermediate portion 41 and a lower portion 42. The portion 40 is of greater length than the portions 41, 42. The portion 41 is so disposed in angular relation with respect to portions 40, 42 to provide for the latter to be arranged in parallel planes, and with the portion 42 forwardly of portion 40. One side of the portion 42 is secured against one side of the arm 37 by the holdfast devices 43 whereby the structure 38 is coupled with the shaft 35 by the combined coupling and spacing element 32. Supported on and intermediate the ends of the portion 40 of bar 39, by a diametrically extending stop pin 44, is an axially apertured abutment or disc 45. Slidably mounted on the portion 40 of bar 39 above the abutment 45 is an axially apertured abutment or disc 46. Surrounding a part of the portion 40 of bar 39 and interposed between the abutments 45, 46 is a coiled urging spring 47 which acts on the rear of frame 1 and constantly urges the elements 29 to penetrate the ground during the operation of the lawn mower. The structure 38 includes a combined guide and presser element 48. The latter forms a guide for bar 39 and a means operated from the handle 14 for increasing the tension of the spring 47 for the purpose of increasing the extent of the penetration of the elements 29 into the ground from their normal depth. The element 48 consists of a sleeve 49 which encompasses the portion 40 of bar 39 and is arranged over and seats upon the abutment 46. Integral with the outer face of the sleeve 49 is an upwardly extending inclined arm 50 which is suitably connected, as at 51, to one side of the handle 14.

On the lowering of the handle 14 to rock the rear of the frame 1 downwardly, the sleeve 49 will be carried therewith, which in turn and in connection with abutment 46 will compress spring 47 to thereby increase the tension of the latter. The downward rocking of the rear of the frame 1 is had against the tension of spring 47 and rocking said rear portion downwardly will provide for the penetration of the elements 29 in the ground to a greater depth. When the handle 14 is moved upwardly to normal position, the tension on the spring 47 is released and the elements 29 will then automatically return to their normal ground penetrating position. When the lawn mower is moved forwardly during the mowing operation the elements 29 of each of the devices 26, 27 will intermittently engage in the ground and provide for such devices and shaft 25 to revolve in unison.

What I claim is:

1. In a ground loosening attachment for lawn mowers, a pair of spaced parallel oppositely disposed combined bearing and hanger elements adapted to be secured to the inner faces of the rearwardly extending side portions of the mower frame, a revoluble shaft having its ends journaled in said elements, ground loosening devices bodily carried with said shaft, spacing means on said shaft between said devices and between certain of said devices and said elements, a vertically movable spring urged means connected at its lower end to one of said spacing means, and a vertically movable spring tension increasing depresser slidably mounted about one part of and bearing against another part of said spring urged means, said depresser being provided with an arm adapted to be connected to the handle of the mower and shifted downwardly by the handle to spring tension increasing position when the handle is lowered to rock the said rear extending portions of the mower frame downwardly.

2. The invention as set forth by claim 1 having said one spacing means formed with an upstanding arm arranged against the lower portion of said spring urged means, and holdfast devices for securing said arm to the lower portion of said spring urged means.

3. The invention as set forth by claim 1 having said depresser in the form of a vertical sleeve and its arm integral with the outer face of said sleeve and extending at an upwardly inclination therefrom.

4. The invention as set forth by claim 1 having said spring urged means including an upstanding bar formed with an offset lower portion secured to said one spacing means, said bar having an abutment supported on its upper portion, a coiled spring encompassing a part of its upper portion and seated at its lower end on said abutment and an abutment slidably mounted on said upper portion, permanently seating on the upper end of said spring and permanently engaged by said depresser.

5. The invention as set forth by claim 1 having each of said ground loosening devices consisting of an annulus having extending radially of the outer edge of the latter spaced pointed ground loosening elements, said spacing means being of annular form, and said annuli being of greater outer diameter than the outer diameter of said spacing means.

FRANK A. SPROUSE.